March 24, 1959 A. D. HOFFMANN ET AL 2,879,324

VIDEO SCRAMBLING AND UNSCRAMBLING SYSTEM

Filed April 8, 1954 3 Sheets-Sheet 1

ALLEN D. HOFFMANN
LUDWIG P. REICHE
INVENTORS

BY Lyon & Lyon
ATTORNEYS

VIDEO SCRAMBLING AND UNSCRAMBLING SYSTEM

Filed April 8, 1954 3 Sheets-Sheet 2

ALLEN D. HOFFMANN
LUDWIG P. REICHE
INVENTORS
BY Lyon & Lyon
ATTORNEYS

VIDEO SCRAMBLING AND UNSCRAMBLING SYSTEM

Filed April 8, 1954 3 Sheets-Sheet 3

ALLEN D. HOFFMANN
LUDWIG P. REICHE

INVENTORS

BY Lyon & Lyon

ATTORNEYS 2,879,324

VIDEO SCRAMBLING AND UNSCRAMBLING SYSTEM

Allen D. Hoffmann and Ludwig P. Reiche, Los Angeles, Calif., assignors to International Telemeter Corporation, Los Angeles, Calif., a corporation of Delaware Application April 8, 1954, Serial No. 421,886

10 Claims. (Cl. 178—5.1)

This invention relates generally to television systems and, more particularly, to improvements in methods of and apparatus for scrambling a television transmission, so that it is made intelligible only by a receiver equipped with suitable unscrambling apparatus.

The recent growth of the television industry and recent experience in television broadcasting indicates that the broadcasting of television entertainment cannot be carried forward on a profitable basis if reliance is placed solely on advertising revenues for defraying the costs of producing and transmitting such entertainment. These factors demonstrate the need for a television transmitting and receiving system which allows each televiewer to be charged for the particular program received on the individual television receivers. Charging for entertainment in this fashion is analogous to the purchase of tickets at the box office of a theater or like place of entertainment, and this analogy has led to recent adoption of the term "box-office television" to describe television systems of this character.

A number of box-office television systems, alternatively known as subscription television systems, have already been described. In one system scrambled, or coded, entertainment material is broadcast in such form as to be unintelligible when received on an ordinary television receiver. Authorized receiving stations are fitted with an unscrambling, or decoding, apparatus which is capable of rendering intelligible the otherwise unintelligible transmissions. This decoding or unscrambling apparatus is controlled by key signals transmitted to the individual receiving stations over the commercial telephone systems, and a charge for supplying the key or control signal is made, the key signal being supplied by a telephone operator only upon request therefor by the subscriber, and the charge being made as an incident to supplying such a key signal upon request.

One of the outstanding disadvantages of a box-office television system of the character described above resides in the necessity for using land lines extending in a network telephone type system from the television transmitting station to each of the television receiving stations, and the necessity for using special switchboard equipment and operating personnel to staff such equipment and make the necessary charges for supplying the key signal.

Another type of box-office television system utilizes a physical key or card which takes the place of the land line used in the system described above. In the physical key or card type system, considerable difficulty would normally be encountered in effecting the distribution of the keys or cards to the many potential users of the system.

The disadvantages of the box-office television systems just mentioned are largely obviated in box-office television systems of the types described in an application filed on January 19, 1950, by David L. Loew et al., Serial Number 139,358, now Patent No. 2,769,023, for Prepaid Entertainment Distribution System and in another application by Robert E. Gottfried et al., filed May 10, 1951, Serial Number 225,651, now Patent No. 2,769,026, for Improvement In Prepaid Entertainment Distribution System, both applications being assigned to this assignee. The systems disclosed in said copending applications utilize a coin collection means at each receiving station and place the unscrambling apparatus under the control of the coin collection mechanism. This obviates the necessity of employing land lines or physical keys for controlling the operation of the unscrambling apparatus. As in the systems described in said copending applications, the operation of the unscrambling mechanism results from the deposit of the coins in the coin collecting apparatus.

An essential feature of any box-office television system is the provision of the coding or scrambling apparatus at the transmitting station and the provision of co-operating decoding or unscrambling apparatus at each of the receiving stations. Such apparatus for maintaining the secrecy of the programs until the necessary price has been paid or the corresponding charge is made must so operate as to render the transmitting signals unintelligible when received on an ordinary television receiver not equipped with the decoding or unscrambling apparatus. The scrambled signals must be of such character as to be capable of being rendered intelligible by means of relatively simple apparatus to be installed at each of the receiving stations. Furthermore, the type of secrecy afforded by the system must be substantially foolproof so as to make substantially impossible the unauthorized reception of the programs without the payment of the price charged for such entertainment. This latter requirement preferably is met by periodically varying the conditions of the coding or scrambling so as to require the unscrambling apparatus at each of the television receivers to be responsive to a control exercised at the transmitting station.

The present system employed for transmitting an image on television is to scan an object in interlaced fashion. Thus a complete picture frame, representative of an optical image at a certain instant, is composed of two fields of consecutively scanned parallel lines arranged so that the lines of one field fall between the lines of another field.

In a patent to Mayle, No. 2,472,774, there is described a system for effecting secrecy in television systems wherein a commutating tube is provided for generating pulses of irregular amplitude which are superimposed upon the sawtooth deflection voltage which is applied as a vertical deflection voltage. This composite wave is then applied to the vertical deflection coils of the television camera. This has the effect of transmitting a picture wherein the interlace of the horizontal lines is not in sequence but is irregular, as determined by the different pulse amplitudes. A similar system is provided at the receiver to permit decoding.

The present invention also operates on the principle of providing an irregular sequence for horizontal scanning of successive fields in a television system. The present invention, however, achieves this result in a new and useful manner and without the necessity for adding two waveforms, one of them with irregular shape. The addition of irregular waveforms requires careful attention to correct phase relation, which is difficult to achieve in practice with a high degree of precision.

Furthermore, the present invention is directed to a television picture scrambling and unscrambling system which is particularly suitable for use with box-office television systems of the type described in the aforementioned applications.

It is an object of the present invention to provide a novel and useful video scrambling and unscrambling apparatus and system suitable for use in a subscriber television system.

It is still another object of the present invention to provide an improved video scrambling and unscrambling apparatus and system which permits simple alterations of the scrambling and unscrambling apparatus to change their operation sequence pattern, thereby preserving secrecy.

It is a further object of the present invention to provide an inexpensive video scrambling and unscrambling apparatus for subscriber television use which enables preservation of secrecy.

It is still a further object of the present invention to provide a scrambling system which scrambles the order of horizontal line groups, thereby presenting an unintelligible picture.

It is still another object of the present invention to provide a coding and decoding system which does not require extreme precision in the addition of two waveforms.

Yet another object of the present invention is the provision of a coding and decoding system for television programs wherein all signals required are provided by the transmitted program signals without the use of auxiliary channels for decoding signals.

The above objects, as well as other features of the invention, are achieved by providing a system wherein a group of pulses is provided to be counted within the duration of a scanning field. A counter counts these different pulse groups, and its output, which is unique for each count, is used to channel vertical deflection signals, each of which has an amplitude representative of a different one of said unique counts, the order of these deflection signals being determined by the order of the predetermined counts.

The features of the invention which are believed to be new are set forth with particularity in the appended claims. The invention itself, however, together with further objects and advantages thereof, may be best understood by reference to the following description, when taken in conjunction with the accompanying drawings, in which:

Figures 1, 3A, 3B:
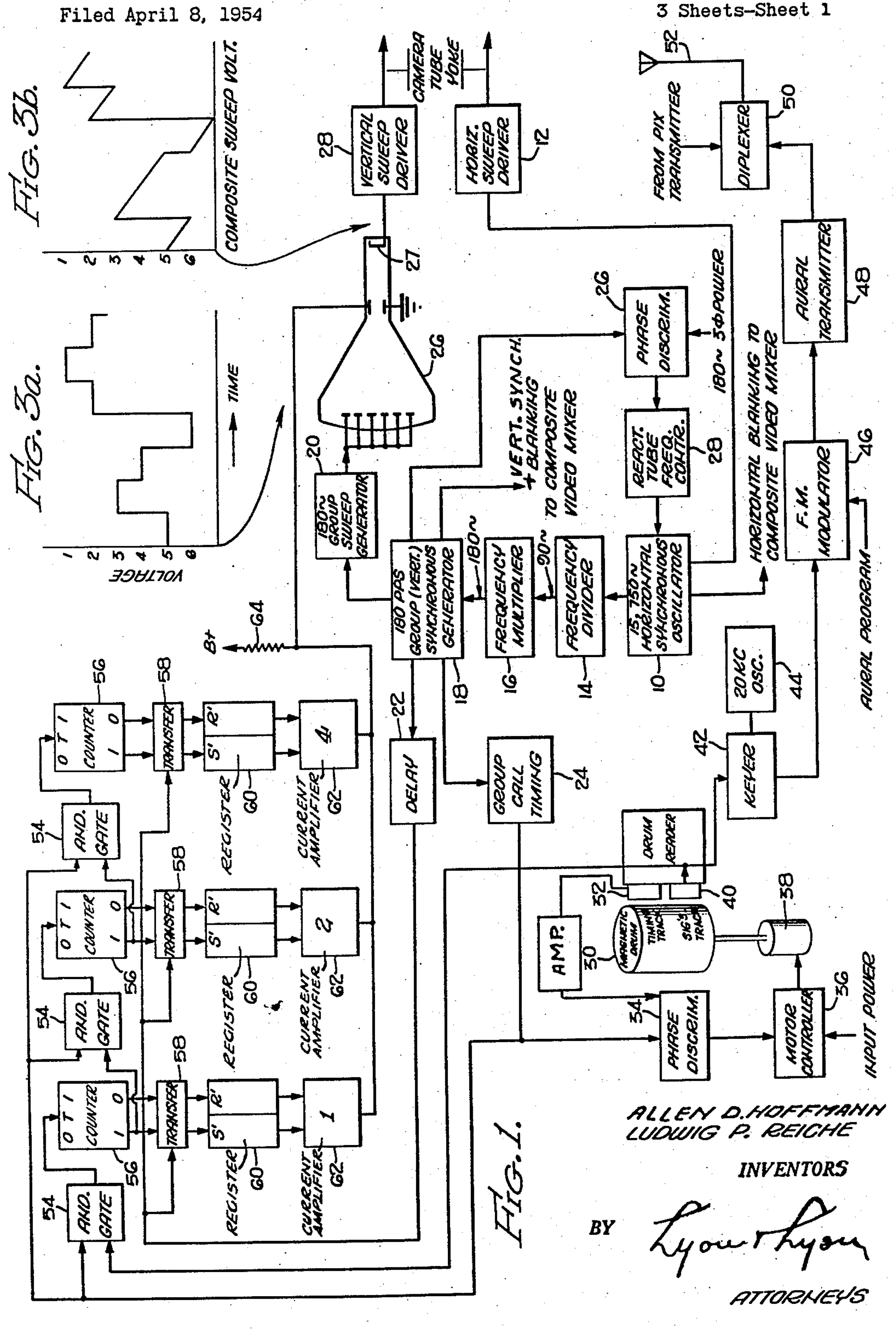
Figure 1 is a schematic diagram of an embodiment of the invention which is used at a television transmitter for scrambling purposes.
Figures 3A and 3B are wave shapes of the pedestal and vertical deflection voltages obtained by using the system described herein.

As briefly described previously, the system used in transmission of television pictures is to scan the object with a number of lines in each field and to interlace the lines to present a frame. Thus, if the lines in the first field were to be numbered 1, 3, 5, 7, . . . the lines in the second field would have the numbers 2, 4, 6, 8, . . . and, due to the nature of the phosphor on a television tube and persistence of vision, the observer would see a picture composed of lines 1, 2, 3, 4, . . . If, for example, one were to transmit in order line 1, then line 5, line 9, line 7, and then, in the second field, transmit lines in the sequence 2, 6, 8, 4, a type of scrambling would be obtained. This occurs since a receiver not equipped with unscrambling apparatus would present these lines in the sequence in which they are received in positions normally occupied by lines 1, 2, 3, 4, . . . and thus a type of scrambled picture is effectuated. A receiver with the unscrambling equipment would receive these lines and present them properly positioned on the television tube so that an intelligible picture is seen.

In an application for a Video Scrambling and Unscrambling System by Louis N. Ridenour, Serial Number 421,924, filed April 8, 1954, there is described a system for scrambling a transmitted video picture by employing a digital counter to rearrange the sequence of transmission of the horizontal lines of the picture. A receiver employs a digital counter to permit the generation of vertical deflection voltages so that horizontal lines appear on the receiver picture tube in the same sequence as they are transmitted. The invention herein also employs a digital counter but in a different manner and with different apparatus in order to rearrange the sequence of transmission of groups of lines at the transmitter to scramble the picture transmitted. The receiver has substantially similar apparatus which generates vertical deflection voltages so that the groups of lines are generated in the same sequence as they are transmitted.

In rendering a television picture unintelligible using coding, as the amount of scrambling is increased the picture becomes more and more unintelligible. However, there is a level of scrambling beyond which further scrambling does not make the picture any more unintelligible as far as the viewer is concerned. This, in effect, is a subjective point of diminishing returns, since further scrambling, although it succeeds in breaking up the fine structure of the picture still further, does not contribute anything to picture confusion as far as the viewer is concerned. The present invention takes advantage of this effect and thus achieves a subjective maximum of picture unintelligibility with a minimum of apparatus. By permutating line groups in space on the face of a cathode-ray tube (or, identically, in time of their transmission over the television channel), the present invention achieves a saving in driving power over that which is required when individual line scrambling is used. There is also a saving in television terminal equipment, and the information handling capacity required of the code transmission channel is considerably reduced. There is a way of reducing the deflection power required when an individual line-scrambling technique is used. This may be achieved by trading power for time, allowing longer retrace intervals. However, for any given number of lines per frame, this method of saving driving power would result in appreciable loss of active scanning time, with corresponding loss of otherwise available picture resolution.

It should be noted further that splitting a frame into six parts, for example, and transmitting the horizontal lines of the six groups in order within each group, but with the six groups themselves in random order, provides an adequately scrambled picture. If there are 525 lines per frame, then allowance to each group is 87½ lines. Allowing 5½ lines for group retrace, a total of 492 active lines remain in the picture, which compares favorably with present practice, yet permits transmission of a group synchronization pulse of sufficient energy to distinguish it easily from the horizontal synchronization pulses.

Reference is now made to Figure 1 wherein a schematic diagram of the present invention is shown. In Figure 1 there is shown only so much of a television transmitter which differs from the television transmitters as they are presently known as is required to understand and reproduce this invention. This is done in order to preserve simplicity in the drawings and explanation. However, from the explanation and drawings, it is believed that the interconnections required in order to incorporate the present embodiment of the invention with the standard television transmitter will be readily apparent to one skilled in the art.

A horizontal sync oscillator 10 of the well-known type, which provides a frequency of 15,750 cycles per second in accordance with the presently established FCC standards, has its output applied to (1) a composite video mixed to provide horizontal blanking (not shown); (2) a horizontal sweep driver 12 (also well known) whence horizontal deflection currents are applied to the camera yokes; and (3) a "divide by 175" frequency divider 14 and then to a "multiply by 2" frequency multiplier 16 to provide 180 pulses per second to synchronize the output of a vertical sync generator 18.

The vertical sync generator 18 will be hereafter referred to as the group sync generator. The output of the group sync generator is applied to (1) a 180-cycle-per-second sweep generator 20; (2) a composite video mixer (not shown) to provide vertical blanking pulses; (3) a one-millisecond delay line 42; (4) a frequency multiplier 44 which multiplies the output by three to provide 540 pulses per second; and (5) a phase discriminator 46. The purpose of the phase discriminator together with a reactance tube frequency control 48 is to provide a servo loop, as is well known, for stabilizing the horizontal and vertical sync frequencies. The reference frequency required in the loop may be provided from the 60-cycle three-phase power obtained from public utility mains after half-wave rectification without filtering.

A magnetic drum 30 is provided which has recorded thereon, in well-known fashion, a series of equally spaced pulses around the periphery to provide a timing track. It will be appreciated that if a magnetic transducer head 32 is used to convert these magnetic pulses into electrical pulses the frequency of the occurrence of the electrical pulses depends upon the speed of rotation of the drum 30. Accordingly, the rotation of the magnetic drum may be accurately controlled and maintained by employing a phase discriminator 34, the inputs to which consist of pulses from the magnetic transducer 32 which is positioned over the timing track and also pulses from the three-times multiplier 24 of the output of the group sync generator 18. These pulses have their phases compared by the phase discriminator 34 and the differential output is applied as an error voltage to a motor controller 36 which controls a synchro-drive motor 38 which, in turn, drives the drum 30. Accordingly, the speed of the drum is synchronized with the 540 pulses per second derived from the group sync generator. The 540-pulses-per-second signal may be referred to hereafter as the group call timing signal.

Referring now again to the magnetic drum, it is also provided with a signal track around its periphery. In the signal track there are recorded at spaced intervals six different pulse groups. By a pulse group is meant a number of pulses in sequence. This number may be different for each pulse group. Another magnetic transducer 40 is employed to detect the pulse groups and apply them as electrical signals to the input of a binary counter to be counted. The pulse groups may be referred to hereafter as group call signals. The group call signals are also applied to a keyer 42 to key the output of a 20 kc. oscillator 44. Accordingly, the keyer output is a 20 kc. wave keyed off and on in accordance with the group call signals. The keyer output is applied to the FM modulator 46 of the transmitter. The 20 kc. keyed wave is then mixed with the television aural program to be transmitted via the aural transmitter 48, diplexer 50, and transmitting antenna 52 to television receivers.

The group call signals are applied from the pickup transducer 40 to a coincidence gate 54. Also applied as an input to this gate are the group call timing signals. The coincidence gate 54 of the type intended is also known as an And gate and requires the simultaneous presence of both input signals before an output is made available. Such a gate may be seen described and shown in an article entitled Diode Coincidence and Mixing Circuits in Digital Computers by Tung Chang Chen, page 511, in the May 1950 IRE Proceedings. The output of this And gate is applied to the first stage of a binary counter consisting of three flip-flop circuits. Between each flip-flop stage 56 in the counter there is provided the same type of And gate 94 having as one input the output of the preceding flip-flop and as the other input the group call timing signal. Accordingly, the group call signals are entered into the counter from the first And gate and they are timed by the group call timing signals.

The output of each flip-flop 56 of the counter is applied to an associated transfer gate 58 which is employed to transfer the binary count into a flip-flop register 60, in order that this count may be staticised. The signal employed to permit the transfer gates to transfer the binary count from the respective flip-flops into the register is provided by the output of the one-millisecond delay network 62 which has had applied thereto the output from the group sync generator. This delay network output consists of delayed 180 pulses per second. Accordingly, the count of the pulses in a group is entered into the flip-flop counter timed by the group call timing pulses which are 540 per second. This count is then transferred into the flip-flop register timed by the group sync generator, which accordingly transfers the count at a rate of 180 per second. Since there are six pulse groups on the drum, each group is transferred into the register each 180th of a second or all of the groups in 1/30 second. Also, the drum speed must be such as to provide the six groups every 1/30 of a second.

The output of the flip-flop register is applied to three current generators 102 of the type previously described. These can have their currents set in the relationship 1, 2, 4, so that the counts can provide eight different currents, depending upon the ones of the current generator selected. The output of the current generators is connected in single-ended fashion across a summing resistor 64 through which B+ is supplied. The output taken at the summing resistor is applied to the deflection plates of a commutator tube 66. This voltage may have the wave shape shown in Figure 3A which is shown for a field. This commutator tube is of a type well known and will be found described in a patent to Goldmark, No. 2,250,479.

Figures 2, 6, 7, 8:
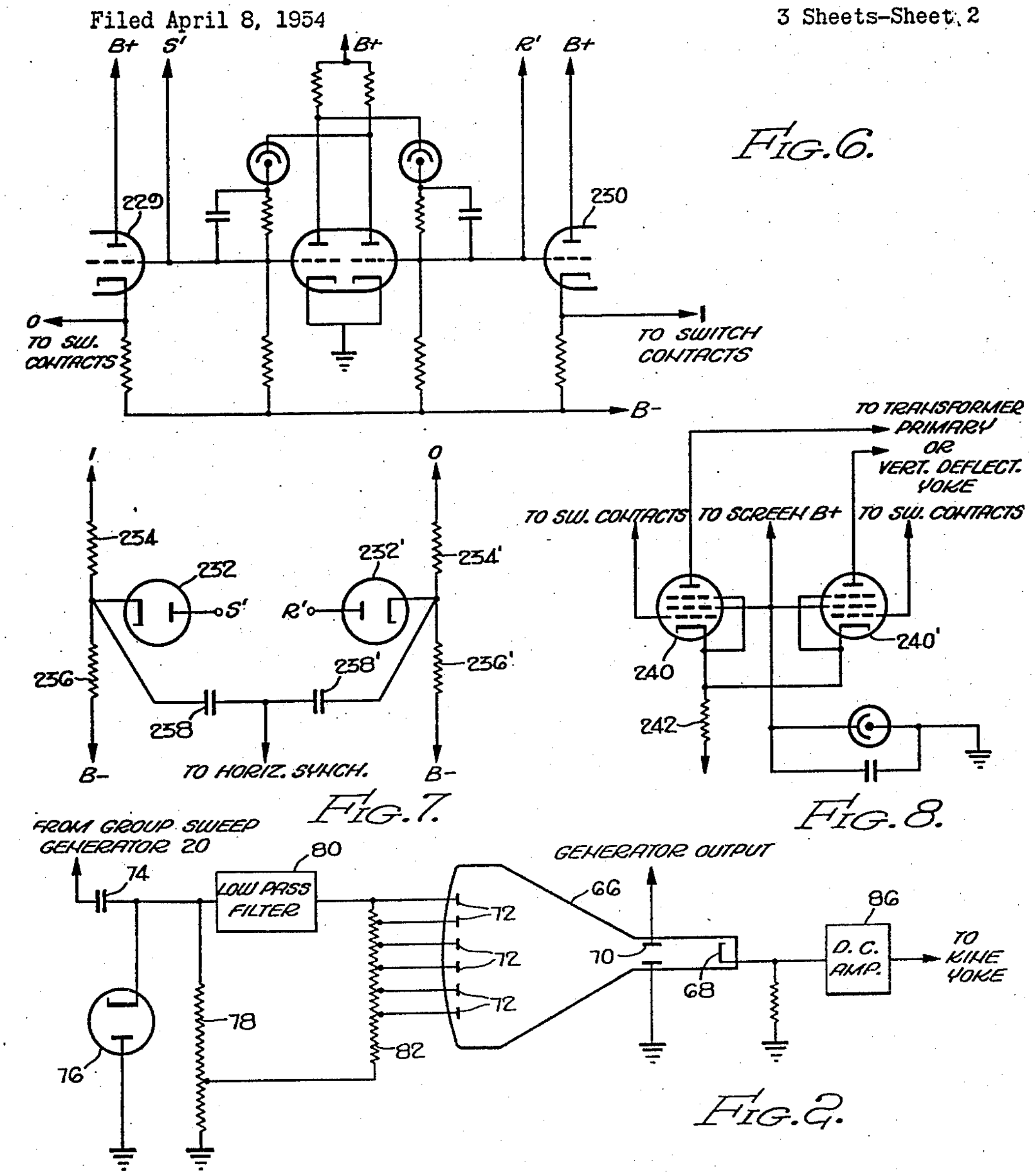
Figure 2 is a detailed circuit of a commutating tube which is used for scrambling and unscrambling a program, respectively, at the transmitter and receiver.
Figure 6 is a circuit diagram of a binary register stage employed in this invention.
Figure 7 is a circuit diagram of a transfer gate employed in this invention.
Figure 8 is a circuit diagram of a current generator employed in this invention.

Reference is now made to Figure 2, which shows the details of the circuitry for the commutator tube. The commutator tube consists of a cathode-ray tube having at least a cathode 68, a deflection electrode 70, and six targets 72, with a separate external lead from each target. An electron beam generated by the cathode is deflected to a desired one of the targets by a deflecting electrode. The output of the group sweep generator 30, which consists of sawtooth pulses occurring at a 180-cycle-per-second rate, is applied through a condenser 74 and across a clamping diode 76 and a resistor 78 to a low-pass filter 80. The output of the low-pass filter 80 is applied across a voltage divider resistor 82. This resistor 82 is connected back to a tap on resistor 78. Accordingly, across the resistor 82 there will be combined D.C. from the rectifier and filter plus A.C. from the tapped portion of resistor 78. Each of the six plates of the commutator tube is connected to a different tap on this voltage divider resistor. The cathode-ray beam of the commutator tube is deflected to different ones of the targets in accordance with the current provided from the current generators. This deflection signal, of course, is determined by the group call signal. The voltage on a target determines the cathode current. Accordingly, the output from the commutator tube is taken through its cathode 68 and applied to a D.C. amplifier 86 which amplifies this signal and thus provides a sweep current of sufficient amplitude to be applied to the camera tube yoke as vertical deflection signals.

Described in more detail, the operation of the commutator tube in the present instance is as follows: The rectifier low-pass filter permits only a direct current voltage to pass through to the voltage divider resistor. However, it will be noted that some sawtooth voltage component is applied since the voltage divider is returned to a tap on the input resistor to the low-pass filter. Therefore, the voltage at any tapping point of the voltage divider resistor is the sum of these two components. The composite voltages obtained here have a resultant wave shape as shown in Figure 3B. This is the wave shape for the vertical deflection current for a field.

The cathode-ray beam is held on each target for an interval of 180th of a second. During this time the voltages on the divider tap to which the target is connected are summed and detected as a modulation of the cathode current of the commutator tube. Since every target is selected at least once within a field, the entire field is covered.

Since the order of selecting the targets is a function of the group call signal, a change of the group call signal recorded on the drum will readily change the code. Thus a program scrambling system is provided which can be very simply changed to provide a new order of the interposition of line groups whenever such new order is desired.

It should be pointed out that the voltage used to deflect the commutator tube needs to be established only approximately, and such a "rough" deflection voltage is provided easily from the summing resistor 64. On the other hand, the camera tube line group pedestal must be established with very high precision relative to the group sweep peak-to-peak voltage. This is accomplished by means of the commutator tube; its main function is to quantize the pedestal voltages precisely relative to the group sweep voltage.

The group call signal may be further characterized as consisting of six pedestal numbers (each pedestal number corresponding to a different target in the commutator tube). These pedestal numbers may be called up in any random sequence.

Figures 4, 5:
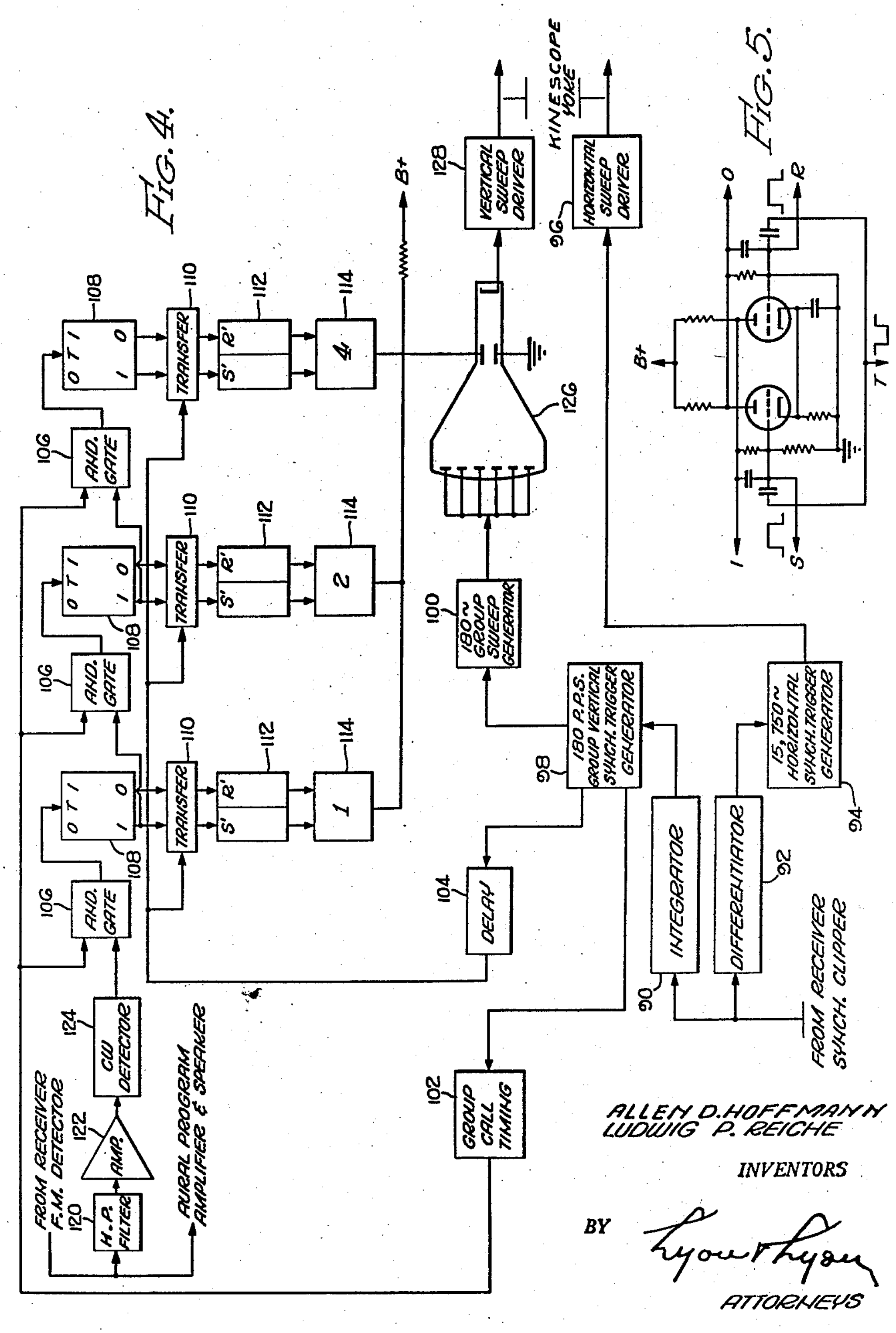
Figure 4 is a schematic diagram of the embodiment of the invention employed at a receiver for decoding purposes.
Figure 5 is a circuit diagram of a binary counter stage employed in this invention.

Referring to Figure 4, the system required at the receiver for decoding the signals transmitted and coding as previously described is seen. The usual integrating and differentiating networks 90, 92 in the receiver provide separation of the horizontal and vertical sync signals. The horizontal sync generator 94 functions in well-known fashion to drive the horizontal sweep driver 96 and provide the horizontal deflection signals for the television tube. The vertical sync generator 98 provides 180 pulses per second to (1) a group sweep generator 100; (2) a multiplier 102 which multiplies the 180 pulses per second by three; and (3) a one-millisecond delay network 104.

The three-times multiplier 102 operates in well-known fashion to provide a 540 pulse-per-second signal which is synchronized with and corresponds to the group call timing signal at the transmitter. Coincidence gates 106, binary counter stages 108, transfer gates 110, register stages 112, and current generators 114 are identical with the structure shown at the transmitter. The group call signal, however, is obtained from the signal received from the FM detector of the receiver (not shown) which is applied first to the audio network of the receiver (not shown) and second to a high-pass filter 120, which eliminates the audio program material, and then to a 20 kc. tuned amplifier 122. Then the output of this 20 kc. amplifier is applied to a C.W. detector 124, which detects the transmitted group call signals. These signals are applied to the first And gate 106 of the counter to be counted and synchronized by the 540 cycle group call timing pulses.

The output of the one-millisecond delay network 104 is again used to transfer the count into the register. The current generators 114 convert the register digital count to an analogue deflection voltage which is employed to operate a commutator tube 126 in the receiver. The network coupling the sweep generator to the six commutator tube targets is identical with that at the transmitter. The output from the cathode of the commutator tube is a deflection current such as may be seen by the wave shape in Figure 3B. This is amplified by the sweep driver 128 to provide the vertical deflection currents for the television picture tube. Thus the operation of these circuits at the receiver is the same as has been described for the transmitter.

It will be appreciated that the system is synchronized with the system at the transmitter. It will be appreciated further that the order of selection of one of the six groups is identical with that selected at the transmitter. It should be appreciated further that unless a receiver includes the equipment shown, the picture received will be completely unintelligible.

Figure 5 is a circuit diagram of a flip-flop which may be found described, for example, on pages 595–597 of Radio Engineering by Terman, published by the McGraw-Hill Book Company. The terminals of the trigger circuit are labeled in accordance with the terminal identifications used in the schematic diagram in Figure 1. In view of the well-known operation of this type of trigger circuit, a further description is deemed unnecessary.

Figure 6 is a circuit diagram of a flip-flop circuit which is suitable for use as a stage in the binary register shown in Figure 1. Here again there is shown another form of the two-tube trigger circuit which is well known in the field. The output of each stage is applied to a cathode follower 229, 230, and the outputs taken from each of these cathode followers are applied to switch contacts in the switching device 222 from which they are interconnected in any desired coding arrangement to the various current generators. The operation of this trigger circuit is also too well known to merit further discussion and is also found in the previous reference, as well as others. The input and output terminals have applied thereto the same identification letters as are used in Figure 1, in order to facilitate the identification thereof.

Reference is now made to the circuit diagram of a transfer gate which is shown in Figure 7. The terminals of the circuit in Figure 7 have the same reference numerals applied thereto as are shown in Figure 1, to facilitate the understanding thereof. The transfer gate consists of two diodes 232, 232', one of which has its anode coupled to the S' terminal of a register flip-flop, the other of which has its anode coupled to the R' terminal of the same flip-flop stage. The cathodes of these two tubes are respectively coupled through individual resistors 234, 234' to the "1" and "0" output terminals of a counter flip-flop stage and also through individual resistors 236, 236' to a source of negative voltage. Two condensers 238, 238' are used to couple the cathodes of these diodes to the source of horizontal sync pulses. Accordingly, if it is assumed that the "1" output of a flip-flop stage is high and the "0" output is low, when a horizontal sync pulse is applied to the cathodes of both diodes they are simultaneously cut off, but when the sync pulse terminates, the anodes of both diodes assume substantially the potentials at their cathodes. Therefore, the S' terminal is made high if it is not already high and the R' terminal is low. Thereby, the grids of the register stage have potentials applied which transfer the register into the same condition as the associated counter stage. In this manner, each time the counter assumes a new count, this is transferred into the register at the termination of the pulse being counted.

Referring now to Figure 8, there may be seen a circuit diagram of the current generator. This consists of two tubes 240, 240' having their cathodes connected together and through a current limiting resistor 242 to a source of negative biasing potential. This current limiting resistor 242 has its value selected so that the binary relationships of each one of the current generators is preserved. In other words, the resistor for the first current generator permits current to flow when the tubes receive the proper signals at their control grids, which current corresponds to the unit "1." The next current generator has two tubes with a common cathode resistor which permits twice as much current to flow, etc.

Figure 9:
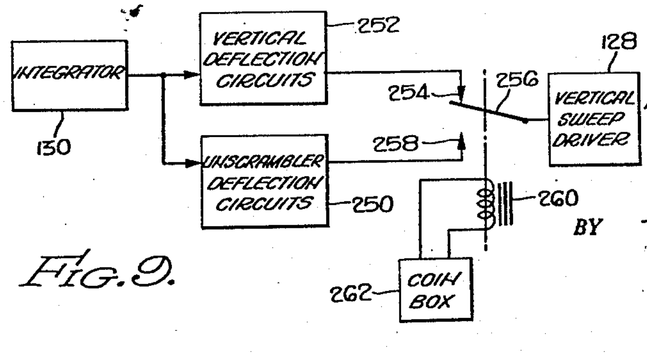
Figure 9 is a schematic diagram of a receiver modification to show the utility of the invention in a subscription television system.

Figure 9 is a schematic diagram showing how the embodiment of the invention may be inserted into the television receiver of a subscriber to a subscription television system so that both paid and free programs may be seen. Connections are brought from the integrator 130 of the receiver to the unscrambler deflection circuits 250 which represent the embodiment of the invention shown in Figure 3. Connection is also made from the integrator to the usual vertical deflection circuits 252 which includes all the necessary circuits in a receiver for vertical deflection except the vertical sweep driver 128. This is connected to the output of the vertical deflection circuits through the normally closed contacts 254, 256 of a relay 260. The output from the unscrambler deflection circuits is connected to the normally open relay contact 258. The coil of the relay 260 is connected to a coin box 262. A suitable coin box and its associated controlling circuitry may be found described in the applications by Loew et al. and Gottfried et al. referred to previously. When the relay 260 is not operated, the subscriber's receiver can receive free programs in the usual manner. If the receiver is tuned to a channel over which a program is to be transmitted for which prior payment is required, by transmission of suitable signals the coin box is actuated to show the amount of payment required. If such payment is not made, the subsequently received picture is scrambled and unintelligible. If the demanded payment is made by depositing the requisite amount of coins in the coin box, the coin box serves to actuate the relay, thus permitting the unscrambling circuits to unscramble the picture being received. Upon cessation of the program the coin box is restored to its initial position, the relay is rendered inoperative, and the receiver is again in condition to receive free programs.

Accordingly, there has been described and shown herein new and improved systems for scrambling a transmitted television program and for unscrambling it at the receiver. The systems shown herein permit, with a minimum of difficulty, a large number of scrambling codes and also permit the changing of such codes with a minimum of difficulty.

We claim:

1. A scanning system for determining the sequence of scanning horizontal lines in successive scanning fields of a television system comprising first electron deflecting means for defining the horizontal component of a scanning trace, second electron deflecting means for defining the vertical component of said scanning trace including a digital counter, means to generate different groups of pulses within the interval of a scanning field, means to apply said different groups of pulses to said counter in succession to be counted, said counter providing a different digital manifestation for each different pulse group count, means to generate deflection signals, and means responsive to said counter to establish as vertical deflection signals different amplitude ranges of said deflection signals corresponding to different digital manifestations of said counter.

2. A scanning system for determining the order of scanning horizontal lines in successive scanning fields of a television system comprising first electron deflecting means for defining the horizontal component of a scanning trace, second electron deflecting means for defining the vertical component of said scanning trace including a digital counter, means to generate different groups of pulses within the interval of a scanning field, means to apply said different groups of pulses to said counter in succession to be counted, said counter providing a different digital manifestation for each different pulse group count, means to generate deflection signals, a potential divider having a plurality of taps, means to apply said deflection signals to said potential divider, and switch means to select the deflection signal output from different taps of said voltage divider in a sequence determined by the different digital manifestations of said counter.

3. A scanning system for determining the sequence of scanning horizontal lines in successive scanning fields of a television tube comprising first electron deflecting means for defining the horizontal component of a scanning trace, second electron deflecting means for defining the vertical component of said scanning trace including a digital counter, means to generate different groups of pulses within the interval of a scanning field, means to apply said different groups of pulses to said counter in succession to be counted, said counter providing a different digital manifestation for each different pulse group count, means to generate deflection signals, a potential divider having a plurality of taps, means to apply said deflection signals to said potential divider, a commutating tube having a cathode-ray beam and a plurality of target electrodes, means coupling each of said target electrodes to a different one of said potential divider taps, means for generating different deflection signals for said commutating tube representative of said different digital manifestations of said counter, means to apply said deflection signals to said commutating tube to deflect its cathode-ray beam to its target electrodes in a sequence determined by the digital manifestation of said counter, and means to derive vertical deflection signals from said commutating tube whose amplitude is determined by said sequence.

4. A scanning system as recited in claim 3 wherein said means to generate different groups of pulses comprises magnetic recording means, means to drive said magnetic recording means at a speed synchronized with said means to generate deflection signals, a pattern of magnetically recorded pulses on said magnetic recording means each representative of said groups of pulses, and transducer means to read said magnetically recorded pulses.

5. A scanning system as recited in claim 3 wherein said counter includes a plurality of binary stages to which said pulse groups are applied to be counted, a binary register, gate means responsive to said means to generate deflection signals to transfer the count of said counter into said register, means to delay said transfer for a predetermined interval and said means for generating different deflection signals for said commutative tube representative of said different digital manifestations of said counter includes a plurality of current generators, and means coupling said current generators to said register to provide a current responsive to the count entered therein.

6. The combination with a television transmitting system of a television picture scrambling system comprising first electron deflecting means for defining the horizontal component of a scanning trace, second electron deflecting means for defining the vertical component of said scanning trace including a digital counter, means to generate different groups of pulses within the interval of a scanning field, means to apply said different groups of pulses to said counter in succession to be counted, said counter providing a different digital manifestation for each different pulse group count, means to generate deflection signals, a potential divider having a plurality of taps, means to apply said deflection signals to said potential divider, a commutating tube having a cathode-ray beam and a plurality of target electrodes, means coupling each of said target electrodes to a different one of said potential divider taps, means for generating different deflection signals for said commutating tube representative of said different digital manifestations of said counter, means to apply said deflection signals to said commutating tube to deflect its cathode-ray beam to its target electrodes in a sequence determined by the digital manifestation of said counter, and means to derive vertical deflection signals from said commutating tube whose amplitude is determined by said sequence.

7. The combination with a television transmitting system including a vertical and horizontal synchronizing pulse generator of a television picture scrambling system comprising means to record a plurality of groups of pulses in a predetermined order, the number of said groups being determined by the number of portions into which a television picture is to be divided and the order of group recording is established to be determinative of the interlace of said portions, a counter, means synchronized by said vertical synchronizing pulse generator to apply said groups to said counter to be counted in said order, means to generate vertical deflection voltages, a potential divider having a plurality of taps, means to apply said vertical deflection voltages to said potential divider, means to select deflection voltage output from different taps of said voltage divider in a sequence determined by the group pulse count of said counter, and means to transmit said plurality of groups in said predetermined order.

8. The combination with a television transmitting system as recited in claim 7 wherein said means to apply said vertical deflection voltages includes an input resistor and a low-pass filter, said low-pass filter having its input connected across a portion of said input resistor and its output connected to said potential divider, and said vertical deflection voltages are applied across said input resistor.

9. In a receiver having vertical synchronizing generating circuits for a subscription television system of the type wherein a program for which payment is required has the video portion scrambled by rearranging the order of groups of horizontal lines, means for unscrambling said video portion comprising a pulse counter having a plurality of electron discharge tubes, different counts being manifested by conduction and nonconduction of all of said tubes in different patterns, means to apply to said counter groups of pulses to be counted within a scanning field, and means to convert the different conduction and nonconduction patterns of the tubes of said counter to different amplitude vertical electron beam deflecting signals, the order of said different patterns determining the order of interlace, means to establish a payment demand for said program at said receiver, normally inoperative means to permit utilization of said vertical electron beam deflecting signals, and means responsive to payment of said payment demand to operate said normally inoperative means to permit utilization of said vertical electron beam deflecting signals.

10. In a subscription television system including a television transmitter having a vertical synchronizing signal generator and a receiver, means at transmitter for scrambling the video portion of a program for which payment of coin is required comprising a digital counter, means to generate different groups of pulses within the interval of a video scanning field, means to apply said different groups of pulses to said counter in succession to be counted, said counter providing a different digital manifestation for each different pulse group count, means to generate deflection signals, a potential divider having a plurality of taps, means to apply said deflection signals to said potential divider, switch means to select the deflection signal outputs from different taps of said voltage divider in a sequence determined by the different digital manifestations of said counter, means to transmit said different pulse groups and said vertical synchronizing signal, means at said receiver responsive to received vertical synchronizing signals to generate deflection signals, a counter at said receiver responsive to received different pulse groups to establish different digital manifestations substantially similar to those at said transmitter, a potential divider substantially similar to the one at said transmitter having a plurality of taps, means to apply the deflection voltages generated at said receiver across said receiver potential divider taps, switch means to select the deflection signal output from different ones of said taps in a sequence determined by the digital manifestations at said receiver, normally inoperative means to permit utilization of said deflection signals, means to establish a coin demand at said receiver for payment for a program, and means responsive to payment of said coin demand to operate said normally inoperative means to permit utilization of said deflection signals.

References Cited in the file of this patent

UNITED STATES PATENTS

| | | |
|---|---|---|
| 2,472,774 | Mayle | June 7, 1949 |
| 2,656,411 | Morris et al. | Oct. 20, 1953 |
| 2,678,347 | Clothier | May 11, 1954 |
| 2,757,226 | Zworykin | July 31, 1956 |

FOREIGN PATENTS

| | | |
|---|---|---|
| 15,789/34 | Australia | Jan. 19, 1934 |